(No Model.)
J. C. KREMER.
WIRE FASTENER.
No. 571,271. Patented Nov. 10, 1896.
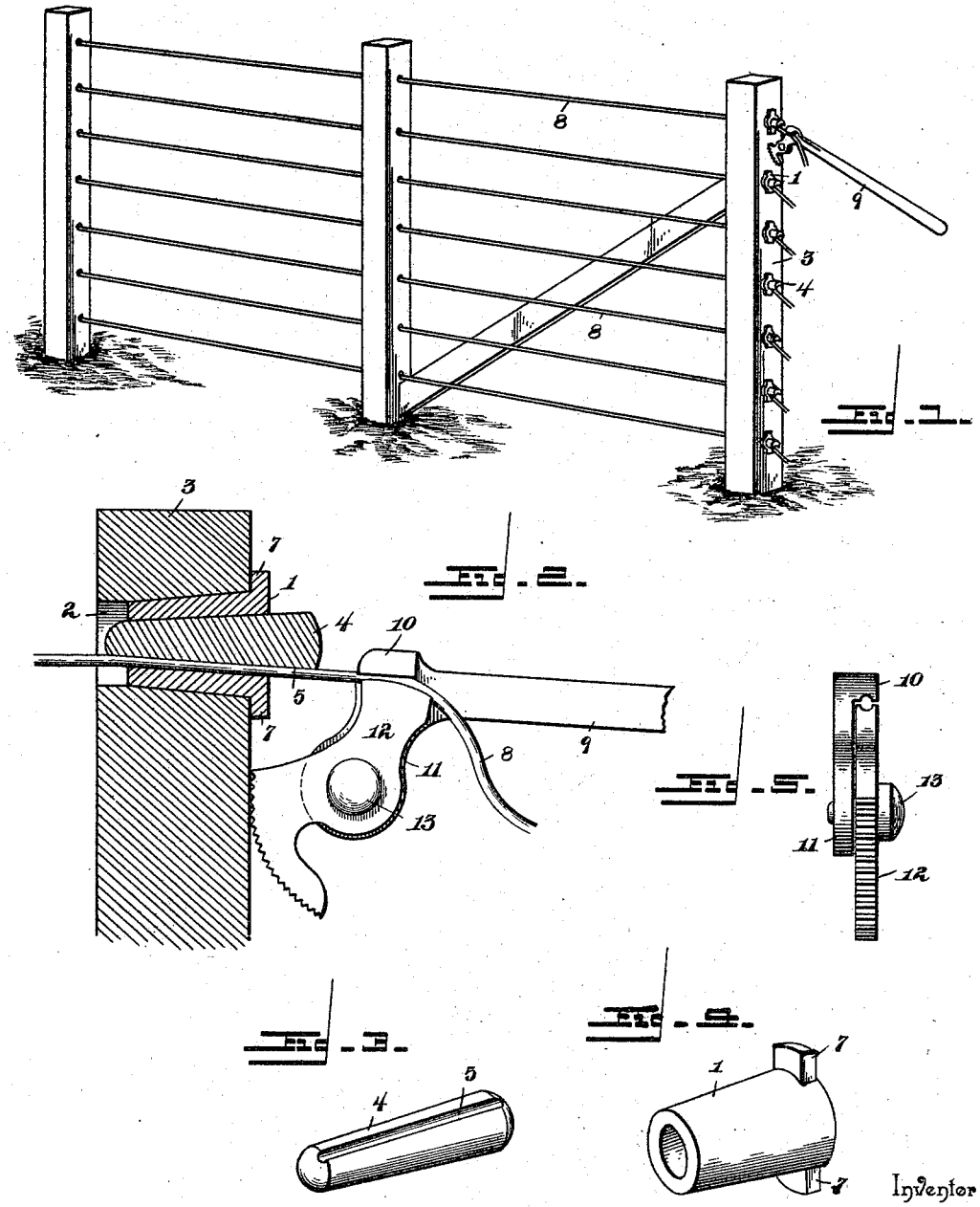
Witnesses
T. W. Riley
J. F. Riley
By his Attorneys,
C. A. Snow & Co.
Inventor
John C. Kremer.

UNITED STATES PATENT OFFICE.

JOHN C. KREMER, OF WADSWORTH, OHIO.

WIRE-FASTENER.

SPECIFICATION forming part of Letters Patent No. 571,271, dated November 10, 1896.

Application filed July 31, 1895. Serial No. 557,783. (No model.)

*To all whom it may concern:*

Be it known that I, JOHN C. KREMER, a citizen of the United States, residing at Wadsworth, in the county of Medina and State of Ohio, have invented certain new and useful Improvements in Wire Fasteners and Stretchers, of which the following is a specification.

The invention relates to improvements in wire fasteners and stretchers.

The object of the present invention is to provide a simple, inexpensive, and efficient device for fastening wires to fence-posts and to enable fence-wires to be conveniently and rapidly stretched to the desired tension.

The invention consists in the construction and novel combination and arrangement of parts hereinafter fully described, illustrated in the accompanying drawings, and pointed out in the claims hereto appended.

In the drawings, Figure 1 is a perspective view of a section of a fence provided with wire-fasteners constructed in accordance with this invention and illustrating the manner of stretching a fence-wire. Fig. 2 is an enlarged detail sectional view illustrating the manner of stretching and gripping a fence-wire. Fig. 3 is a detail perspective view of the tapered plug or wedge. Fig. 4 is a similar view of the tapered sleeve which receives the plug or wedge. Fig. 5 is a detail view of the wire-stretcher.

Like numerals of reference designate corresponding parts in all the figures of the drawings.

1 designates a vertical series of tapered sleeves arranged in corresponding perforations 2 of a fence-post 3 and receiving tapered plugs or wedges 4, which are provided at their lower faces with longitudinal wire-receiving grooves 5. Each tapered sleeve is provided at its enlarged end with lugs 7, disposed at right angles to the sleeve and engaging the outer face of the post and locking the sleeve against further inward movement.

The sleeve terminates short of the perforation of the post, and the plug or wedge, which conforms to the configuration of the sleeve, extends beyond the inner and outer ends thereof, and it is capable of firmly and uniformly gripping the fence-wire 8.

The longitudinal groove 5 of the tapered plug or wedge is segmental in cross-section, it conforms to the configuration of the adjacent portion of the fence-wire, and it is capable of clamping the same without mutilating the fence-wire, even when it is driven into the sleeve or thimble. The tapered wedge or plug engages the fence-wire throughout the entire length of the sleeve. It is capable of securely holding the fence-wire without any mutilation or weakening of the same, and a slight tap on the inner end of the tapered plug or wedge will release a fence-wire and enable the same to yield to any contraction.

The wire-stretcher is especially adapted for use in connection with the wire-fasteners, it affords sufficient space for manipulating the tapered plugs or wedges, and it is composed of a handle 9, provided at its inner end with a laterally-disposed lug 10 and having a depending arm 11, and a pivoted jaw 12, mounted on the arm and coöperating with the lug 10 to clamp with a fence-wire. The jaw 12 is pivoted to the lower end of the arm 11 at a point intermediate of its ends by a fastening device 13, its inner or upper edge is curved to engage a fence-wire, and its lower or outer end is provided with an extension forming a heel or fulcrum for engaging a fence-post. The opposed faces of the lug and the engaging end of the jaw are provided with wire-receiving grooves to avoid cutting or otherwise mutilating a fence-wire, and the heel or fulcrum 14 has a curved engaging edge provided with teeth to prevent it from slipping on a fence-post. A slight pressure on the outer end of the handle-lever 9 will readily stretch a fence-wire to the desired tension, and the jaws which engage the fence-wire are located a sufficient distance from the outer end of the wedge or plug and the sleeve to enable the wedge or plug to be readily manipulated.

It will be seen that the device for fastening fence-wires to a fence-post is exceedingly simple and inexpensive in construction and is adapted to be readily applied to a post, and that it is capable of firmly gripping and securely holding a fence-wire without mutilating or impairing the strength of the same. It will also be apparent that the wire-stretcher is exceedingly simple and inexpensive in construction, that it is strong and durable, and that it is capable of readily stretching a fence-wire without cutting, crushing, or otherwise mutilating the same or impairing the strength thereof, and that it will afford sufficient space for readily manipulating the tapered plugs or wedges.

Changes in the form, proportion, and minor details of construction may be resorted to without departing from the spirit or sacrificing any of the advantages of this invention.

What I claim is—

1. A wire-fastener, comprising a tapered or conical sleeve having a smooth unbroken bore and provided with means for engaging a post, and a conical or tapered plug arranged within the sleeve, projecting beyond the smaller end thereof and provided with a longitudinal groove adapted to engage a wire, substantially as described.

2. The combination with a fence-post having an opening 2, of a conical or tapered sleeve arranged within the opening 2 of the fence-post, terminating short of the inner face thereof and provided at its outer end with lugs engaging the outer face of the post, said sleeve being provided with a smooth unbroken bore, and a conical or tapered plug arranged within the sleeve or bore, provided with a longitudinal groove and projecting beyond the inner or smaller end of the sleeve, substantially as described.

JOHN C. KREMER.

Witnesses:
A. M. BAKER,
A. A. HOLCOMB.